United States Patent Office 2,845,369
Patented July 29, 1958

2,845,369

ION EXCHANGE PURIFICATION OF FRUCTOSE SOLUTION

Raymond V. Davis, Chicago, and Ira B. Cushing, Waukegan, Ill., assignors to Abbott Laboratories, North Chicago, Ill., a corporation of Illinois No Drawing. Application August 29, 1955
Serial No. 531,251

6 Claims. (Cl. 127—46)

This invention relates to purifying solutions of oxidized polyhydric alcohols and more specifically to a method of purifying fructose solutions prepared by fermented solutions of mannitol with an Acetobacter and to the product thus purified.

It is known that Acetobacter microorganisms produce enzymes which catalyze the oxidation of polyhydric sugar alcohols to the corresponding keto sugars (Iowa State College Journal of Science, 13, 279, 1939). During the process of oxidizing the polyhydric alcohols, such as mannitol, by the Acetobacter an appreciable quantity of color bodies and potential color-forming impurities are produced. It is possible to effectively remove the color bodies formed during the fermentation or oxidizing process by treating the solution with a suitable decolorizing carbon. There remains, however, after the said decolorizing treatment, a substantial amount of potential color formers which cause a marked darkening of the solution when autoclaving to form a sterile injectable solution thereof. And, although crystals of fructose can be obtained from the fructose solutions by concentrating and crystallizing from alcohol when a 10% solution of the crystals thus obtained is autoclaved sufficient to sterilize the said solution, a deep yellow color is formed therein which renders the solution unacceptable for pharmaceutical use. Thus, in order to obtain highly purified pharmaceutically acceptable fructose solutions or crystals of fructose having the required purity from fermentation beer, it is necessary that the fermentation beer be purified so that there is no appreciable color formed therein when a fructose solution is autoclaved or subjected to a heat treatment sufficient to sterilize the fructose solution.

It is therefore an object of the present invention to provide an improved method of purifying a solution of a fermented polyhydric sugar alcohol.

It is also an object of the present invention to provide an improved method of removing impurities which are responsible for the formation of color bodies therein from a solution of an oxidized polyhydric alcohol.

It is a still further object of the present invention to provide a novel method of improving the color stability of a solution of fructose.

It is still another object of the invention to provide an improved method of purifying a fructose solution prepared by oxidizing a solution of mannitol with an Acetobacter, whereby the rate of formation of color bodies therein is retarded.

Other objects of the invention will be apparent from the detailed description and claims to follow.

It has been discovered that the foregoing and other objects of the invention are achieved by raising the pH of a solution of an Acetobacter oxidized polyhydric sugar alcohol, such as mannitol which has been oxidized to fructose, to a pH above pH 7 in order to accelerate the condensation of the potential color-forming bodies, and thereafter removing the condensed color bodies from the solution by passing the solution through ion exchange resins comprising a cation exchange resin and an anion exchange resin. It has been further discovered that the initial alkaline treatment of the said fructose solution can be effected either by adding an alkaline reagent to the said solution, by first passing the said solution through a strongly basic anion exchange resin column, or preferably by combining both the alkaline reagent and an anion exchange resin column treatment.

In accordance with the herein disclosed invention the fructose beer solution is maintained at an alkaline pH for a sufficiently long period to allow the potential color-forming bodies therein to condense to a form which can be removed upon subsequently contacting with a cation exchange resin and an anion exchange resin. Thus, when the pH of the fructose beer is at a pH 10 or above, for example, the rate of condensation of color bodies is very rapid and is generally complete in about 15 minutes even though there is very little or no visible color developed in the fructose beer. It is also possible to effect condensation of the color bodies of the fructose beer by adjusting the pH of the said beer to a pH of 7.5 and after standing at the latter pH for about 30 minutes and removing substantially all the condensed color bodies by passing the beer through a cation exchange resin column and an anion exchange resin column. It is generally undesirable to hold the fructose beer any longer than necessary before concentrating to a syrup, as the chance for contamination of the beer by bacterial growth is great and for this reason the fructose beer is generally adjusted to a pH of at least 9.5 and preferably to about pH 10. When the fructose beer is maintained at a pH appreciably in excess of pH 11, degradation of the fructose in solution ensues. Therefore, pH's above pH 11 are avoided.

In those instances where the initial alkalinity is achieved by using an alkaline reagent in combination with an initial anion exchange resin column treatment, the amount of alkaline reagent used is preferably that required to form a flocculent precipitate in the filtered beer, since a flocculent precipitate will form directly on the resin column and prevent normal flow therethrough if insufficient alkaline reagent is used. The minimum amount of alkaline reagent necessary to form a precipitate generally is between about 1 and 1.5 ml. of 5 N sodium hydroxide per 750 ml. of the filtered fructose beer. It is preferable, however, to use a slight excess of the alkaline reagent, in which case about 3 ml. of 5 N sodium hydroxide is used per 750 ml. of filtered beer. In the latter instance, it will be appreciated that the beer so treated and prior to passing through the anion exchange column does not necessarily have a pH as high as 10 nor is the pH of the beer at this stage necessarily in excess of pH 7, since passage of the beer thus treated through a suitable anion exchange resin column will raise the pH of the solution up to a pH at which condensation of the color bodies takes place at a relatively fast rate. Where no anion exchange resin column is used before passing the solution through the cation exchange resin column, it is, of course, necessary to add more than 3 ml. alkaline reagent per 750 ml. beer in order to raise the pH of the fructose beer solution to about pH 10 or at least to a pH at which condensation of color bodies takes place within a reasonable period. Thus, as much as 6 ml. of 5 N sodium hydroxide can be added per 750 ml. of filtered beer without serious loss of fructose even on standing for a prolonged period of about 65 hours, since the pH of the filtered beer falls rapidly below the point where the fructose beer is degraded.

It has also been found that alkaline reagents other than sodium hydroxide can be used to produce the necessary alkalinity in the fructose beer and entirely satisfactory results are obtained by using, for example, sodium carbonate as the alkaline reagent. Also, an amount of sodium chloride equivalent to the sodium concentration in 3 ml. sodium hydroxide produces a satisfactorily decolorized solution, since on passage of the sodium chloride-treated fructose beer solution through a strongly basic anion exchange resin column, the salt is split and produces the necessary alkalinity to raise the pH of the solution to about pH 10.

Following any of the above alkaline treatments, the fructose solution generally has a green-yellow or brownish-yellow color. Although the initial condensation product of the color-forming bodies are colorless products, the latter are transformed into colored products on further standing. All of the colored products and substantially all of the potential color-forming bodies, however, are removed upon passing the fructose solution through a cation exchange resin column and an anion exchange resin column. Subsequent concentration of the solution and crystallization of the sugar from a suitable organic solvent gives a product substantially free of the color formers described above which are normally present in the beer.

The anion and cation exchange resins which are particularly useful for the removal of color-forming impurities from the fermented polyhydroxy alcohol solutions in the present invention are the relatively strongly basic anion exchange resins and relatively strongly acidic cation exchange resins. The anion exchange resins which are most useful in the present invention are the relatively strongly basic anion exchange resins containing quaternary ammonium groups and which thus have the ability of splitting salts in addition to having absorbing capacity for acids. Among the anion exchange resins in the foregoing class which are useful in the present invention are the resins prepared by polymerizing a mixture of styrene and divinyl benzene and thereafter haloalkylating the resulting polymer, such as by treating with chlormethyl methyl ether, and treating the haloalkylated products with a tertiary amine, such as trimethylamine (Dowex I–X8), triethylamine (Amberlite IRA–400), or diethylethanolamine (Amberlite IRA–410), and dimethylethanolamine (Dowex 2), to form quaternary ammonium groups therein. Products prepared in the foregoing manner are sold under such trade names as Amberlite IRA–400, Amberlite IRA–410, Dowex I–X8, Dowex 2, Duolite A–42, and Permutit S–1. More specifically, resins of the type such as Amberlite IRA–400 and Dowex I–X8 can be prepared by the method disclosed in U. S. Patent No. 2,591,573 and the resins of the Amberlite IRA–410 and Dowex 2 type can be prepared according to the method disclosed in U. S. Patent No. 2,614,099. It is also possible to employ in the present invention in place of the previously disclosed anion exchange resins the anion exchange resins which have an aliphatic matrix containing quaternary ammonium groups in addition to tertiary amine groups, such as Duolite A–41. Other strongly basic anion exchange resins which have utility in the present invention are resins which have the quaternary ammonium group as an integral part of the matrix of the resin, as where a weakly basic resin, such as Amberlite IR–4B, is treated with an alkylating agent to transform the primary and secondary amine groups into strongly basic quaternary ammoniums. Those skilled in the art will recognize that other strongly basic anion exchange resins having similar properties can also be used in the present invention.

Among the cation exchange resins of the above type which are most useful in the present invention are Amberlite IR–112, Amberlite IR–120, and Dowex 50 which are copolymers prepared by reacting styrene with varying amounts of divinyl benzene and sulfonating the aromatic nucleus. Resins of the foregoing type are prepared in accordance with the process disclosed in U. S. Patent No. 2,366,007. Also useful in the present invention in place of the above resins are the cation exchange resins obtained by condensing an aldehyde, a phenol, and an organic sulfonic acid to give sulfonated polymeric resins, such as Amberlite IR–100, Wofatite K, Duolite C–3, and Duolite C–10. Other resins having the properties of the foregoing strongly acidic cation exchange resins can also be used in the present invention.

In establishing a standard for measuring the effectiveness of the purification treatment, it has been observed that a 10% fructose solution having an optical density of about 0.040 or below when examined in a clear 500 ml. or 1-liter glass container under blue light, is colorless to the eye. Thus, a limit on the maximum optical density of a 10% solution of fructose after autoclaving has been set at about 0.050 in a 1 cm. cell. In determining the optical density, the fructose solution at any stage during the processing thereof or after passing through the final ion exchange resin column or after crystallization, is adjusted to a 10% fructose concentration and autoclaved for 20 minutes at a temperature of 114° C. An aliquot of the autoclaved solution is then placed in a 1 cm. cell and examined with light having a wave length of 350 mu and the reading thus obtained being the recorded optical density of the said solution.

The sugar solutions which are purified in accordance with the teaching of the present invention are prepared by oxidizing a polyhydric sugar alcohol, such as mannitol, by means of an Acetobacter microorganism which produces an enzyme catalyzing the said oxidation of the alcohol to the corresponding keto sugar. (Iowa State College Journal of Science, 21, 251, 1947.) While several species of genus Acetobacter catalyze the oxidation of polyhydric sugar alcohols to the corresponding keto sugar, the species *Acetobacter suboxydans* is most effective in oxidizing mannitol to fructose. The particular strain of organism used in the herein disclosed specific examples is *Acetobacter suboxydans* NRRL B–72.

The spore cultures of *Acetobacter suboxydans* NRRL B–72 are prepared by transferring half of a test tube agar spore slant onto 125 ml. of an aqueous culture medium comprising 7% mannitol, 0.5% yeast extract, and 0.005% potassium acid phosphate contained in a 500 ml. Erlenmeyer flask. A second flask is inoculated in the foregoing manner and each culture is grown in shaken culture for 24 hours and the contents transferred to a 12-liter bubble bottle containing 10 liters of an aqueous medium comprising 5% mannitol and 0.25% yeast extract. The spores in the bubble bottle are cultured for 24 hours at a temperature of 28° C.

The vegetative inoculum used to inoculate the fermenter in which the mannitol or other polyhydroxy sugar alcohol is converted into fructose or other corresponding keto sugar is prepared by transferring the entire contents of the bubble bottle cultured in the foregoing manner into a 50-gallon seed tank containing 30 gallons of an aqueous medium comprising 18% mannitol and 0.25% yeast extract. The inoculated medium is cultured at 28° C. for about 20–24 hours with an oxygen transfer rate of 2.5. The fermenter inoculum should comprise about 10% of the fermenter medium which is comprised of sterile water containing about 18% mannitol and 0.5% yeast extract and preferably with 0.05% potassium acid phosphate.

The fermentation beers used in the specific examples were prepared by fermenting in a suitable fermenter a fermentation medium consisting of about 20% mannitol, 0.5% yeast extract (2019 yeast) and having a pH of 6.0 and inoculating with a vegetative inoculum comprising *Acetobacter suboxydans* NRRL B–72, prepared in the aforementioned manner, and allowing the said medium to ferment at a temperature of about 28° C. for a period of about 24 hours. If desired, after fermenting about 24 hours, an additional 10% mannitol can be added to the fermenter. The medium is allowed to ferment until all the mannitol is converted to fructose, a condition which is attained after fermenting about 69 hours.

The following specific examples are for the purpose of illustrating the present invention and should not be construed so as to be limited to the particular amounts specified therein.

EXAMPLE I

Fructose fermentation beer (800 ml.), prepared in the above-described manner and containing about 18% fructose, is treated with 1% by volume activated carbon, such as Nuchar C–190N, and 1% by volume of a finely divided diatomaceous earth, such as Supercel-Hyflo, for about 30 minutes and filtered. The filtered beer (750 ml.) is then treated with 2.5 ml. of 5 N sodium hydroxide and stirred for 15 minutes. About 1% by volume of a finely divided diatomaceous earth, such as Supercel-Hyflo, is added to the alkaline beer and the stirring continued for 15 minutes. The beer is filtered to remove the solids therefrom, and the filtrate is passed through about 50 ml. of regenerated IRA–400 anion exchange resin at a depth of about 16 cms. at a flow rate of about 30 ml. per minute. The effluent (pH=10.5) is passed through a column of about 150 ml. of regenerated IR–112 cation exchange resin at a depth of about 48 cms. (pH=2.5–3.0) at a flow rate of about 30 ml. per minute. A final passage through a column of about 150 ml. of regenerated IRA–400 anion exchange resin at a depth of about 48 cms. at a flow rate of about 30 ml. per minute is now carried out and the resulting syrup concentrated under vacuum to about 85% fructose and crystallized in an equal volume of absolute alcohol for about 16 hours. The resulting crystals are low in potential color formers, as evidenced by the low optical density readings taken at a wave length of 350 mu, and by the APHA readings, after autoclaving a 10% solution in a glass container at a temperature of 114° C. for a period of 20 minutes.

Optical density, pH, optical rotation, and volume are recorded at significant stages of the processing. Optical rotation and volume readings are preferably recorded at each stage of the process to permit determining the yield of fructose at any stage. It has been found, in general, that the greatest loss of fructose incurred throughout the process takes place in the crystallization step and during the passages through the IRA–400 resin column. This latter loss is explained by the known conversion of fructose to glucose and by the absorption of fructose along with impurities on the IRA–400 resin. The percent loss due to conversion is small relative to that due to absorption. However, by using relatively small amounts of IRA–400 and relatively rapid flow rates, as in the preferred process, the losses due to both these phenomena are unexpectedly small. The flow rates used on each of the resin columns of the above-mentioned dimensions are about 30 ml. per minute.

The following Table I summarizes the data of the foregoing example:

Table I

| Solution | pH | Optical Density, 350 mu |
|---|---|---|
| Beer (SF–68) | 3.8 | |
| After Filtration (Carbon and Supercel) | | |
| After Sodium Hydroxide and Refiltration | | |
| After IRA–400 | 10.5 | |
| After IR–112 | | |
| After IRA–400 | | |
| After Crystallization | | |
| After Autoclaving (10% Fructose Solution) | | .030 |

Percent purity of crystals=99%.

A 10% solution of the crystals obtained in the foregoing manner when subjected to illumination with light having a wave length of 350 mu through a 1 cm. cell exhibit an optical density of 0.030 after autoclaving for 20 minutes at 114° C. and is substantially colorless to the human eye.

EXAMPLE II

Fermentation beer (760 ml.) containing about 18% fructose which has been prepared in accordance with the fermentation procedure previously described, and clarified by treating with activated carbon (1%) and diatomaceous earth (1%), is filtered and thereafter treated with 3.0 ml. of 5 N sodium hydroxide with stirring for about 15 minutes. To the alkaline solution is then added 7.6 g. of finely divided diatomaceous earth and the mixture stirred for about 15 minutes and filtered. The filtered beer is then passed through an ion exchange column of about 50 ml. of regenerated IRA–400 anion exchange resin at a depth of about 16 cms. The effluent is passed through a column of about 150 ml. of regenerated IR–112 cation exchange resin at a depth of 48 cms. The effluent from the latter column is then passed through about 150 ml. of regenerated IRA–400 anion exchange resin at a depth of about 48 cms. The resulting syrup is then concentrated under vacuum to about 85% fructose. The latter syrup is then admixed with about an equal volume of ethyl alcohol and allowed to crystallize for 16 hours. Samples of the 85% fructose syrup and syrup prepared from the crystals of fructose are prepared as a 10% solution, autoclaved for 20 minutes at a temperature of 114° C., and examined in a 1-cm. cell with light having a wave length of 350 mu to determine the optical density of the respective solution. The following Table II summarizes the data of the foregoing example:

Table II

| Solution | pH | Optical Density, 350 mu |
|---|---|---|
| Filtered Beer (P–81A) | | |
| Refiltered Beer (After Sodium Hydroxide) | 9.7 | |
| After IRA–400 | 10.6 | |
| After IR–112 | 3.3 | |
| After IRA–400 | | |
| After Autoclaving (10% Syrup) | | .050 |
| After Autoclaving (10% Crystals) | | .029 |

$[\alpha]^{20°} = -88°$ or 98.5%.

It is evident from the foregoing data that the 10% solution of the 85% fructose syrup and a 10% solution of the crystals obtained therefrom, prepared according to the foregoing method, are acceptable colorwise for pharmaceutical use after autoclaving and that colorwise the crystals yield a markedly superior fructose solution.

EXAMPLE III

A fermentation beer (1200 gal.) prepared in the above-described manner and containing about 18% fructose is treated with 45.5 kg. of activated carbon (Nuchar C–190N) and 45.5 kg. of diatomaceous earth (Hyflo) and stirred for about 30 minutes. To the filtered beer is then added 91 kg. of diatomaceous earth (Hyflo) with stirring to distribute evenly, and 20% sodium hydroxide solution is slowly added to the filtered beer until the pH is about 9.0 and the beer is stirred for about 15 minutes and filtered. One gallon of filtered beer requires approximately 10.5 ml. of 20% sodium hydroxide solution. The filtrate is then passed through a column containing 79 gallons of IRA–400 anion exchange resin having a bed depth of about 17 inches at a rate of 15 gallons per minute. The effluent is then passed through a column containing 237 gallons of IR–112 cation exchange resin having a bed depth of 50 inches at a rate of about 15 gallons per minute. The effluent of the latter column is then passed through a column containing 237 gallons of IRA-400 anion exchange resin having a bed depth of 50 inches at a rate of about 15 gallons per minute. The fructose syrup is then concentrated to about 85% fructose and crystallized, if desired for more convenient storage and handling, in the usual manner.

The following Table III summarizes the data of the foregoing example:

Table III

| Solution | pH | Optical Density, 350 mu |
|---|---|---|
| Raw Beer (P-83) | 3.5 | |
| Filtered Beer (After Carbon) | 4.2 | |
| Refiltered Beer (After Sodium Hydroxide) | 7.7 | |
| After IRA-400 | 10.1 | |
| After IR-112 | 4.1 | |
| After IRA-400 | | |
| After Autoclaving (10% Syrup) | | .038 |
| After Autoclaving (10% Crystals) | | .043 |

$[\alpha]^{25°}$ on crystals = $-88°$ or 99% fructose.

It is apparent from the foregoing table that the syrup obtained in the foregoing example has a low optical density both prior to and after crystallization, and a 10% fructose solution prepared from the 85% fructose syrup and the crystals obtained therefrom are highly acceptable for pharmaceutical use.

EXAMPLE IV

The fermentation beer (750 ml.) used in Example I is clarified by treatment with activated carbon (7.5 g.) and diatomaceous earth (7.5 g.) and filtered. The filtrate is then passed through a column containing about 50 ml. of regenerated IRA-400 anion exchange resin having a bed depth of about 16 cms. To the effluent is then added 3.0 ml. of 5 N sodium hydroxide and the solution stirred for 15 minutes. Thereafter about 1% by volume of diatomaceous earth is added to the alkaline fructose solution and the solution filtered. The filtrate is then passed through a cation exchange resin column of about 150 ml. of IR-112 having a bed depth of about 48 cms. The effluent is then passed through a second column of IRA-400 anion exchange resin having a bed depth of 48 cms. and the resulting syrup obtained is concentrated under vacuum to about 85% fructose and crystallized in the usual manner.

The following Table IV summarizes the data of the foregoing example:

Table IV

| Solution | pH | Optical Density, 350 mu |
|---|---|---|
| Beer (SF-68) | 3.8 | |
| Filtered Beer (Carbon and Supercel) | | |
| IRA-400 (30 ml.) | | |
| After Sodium Hydroxide and Filtration | 10.1 | |
| After IR-112 | | |
| After IRA-400 | | |
| After Crystallization | | |
| After Autoclaving (10%) | | 0.050 |

The foregoing data show that the step of treating the filtered fructose containing fermentation beer with the anion exchange resin prior to the alkali treatment thereof, produces crystals which when autoclaved in the usual manner are capable of being used as a pharmaceutical solution.

EXAMPLE V

A fermentation beer prepared in the above manner is subjected to the alkali treatment and anion and cation exchange resin treatment described in Example I and the data obtained is set forth in Table V.

Table V

| Solution | pH | Optical Density, 350 mu |
|---|---|---|
| Filtered Beer (P-79) | 7.4 | |
| Refiltered Beer (After Sodium Hydroxide) | 10.0 | |
| After IRA-400 | 10.5 | |
| After IR-112 | 3.1 | |
| After IRA-400 | | |
| After Autoclaving (10% Crystals) | | .022 |

$[\alpha]^{25°} = -90°$ or 99–100% pure.

EXAMPLE VI

The fermentation beer (750 ml.) containing about 18% fructose and prepared as described herein is clarified by treating with activated carbon (7.5 g.) and diatomaceous earth (7.5 g.) and filtered. The filtered beer is then treated with 300 mg. of sodium chloride. The beer is then passed through an anion exchange column containing about 50 ml. of regenerated IRA-400 anion exchange resin having a depth of about 16 cms. The effluent is passed through a column of about 150 ml. of regenerated IR-112 cation exchange resin having a depth of about 48 cms. and the effluent from the latter column is passed through about 150 ml. of regenerated IRA-400 anion exchange resin having a depth of about 48 cms. The resulting beer is concentrated under vacuum to about 85% fructose and crystallized as in Example I. Samples of the crystals prepared as a 10% solution are autoclaved for 20 minutes at a temperature of 114° C. and exhibit an optical density of 0.035 when examined in a 1 cm. cell with light having a wave length of 350 mu.

EXAMPLE VII

Fructose fermentation beer (740 ml.) is clarified by treating with activated carbon and diatomaceous earth as in Example VI. The filtrate is then treated with 800 mg. of anhydrous sodium carbonate. Thereafter the beer is passed through the short anion exchange column as in Example I and the effluent therefrom exhibits a pH of 10.4. The effluent is then passed through the IR-112 and IRA-400 anion exchange resin columns as in Example I. The beer is concentrated to 85% syrup and crystallized in the usual manner and the crystals when prepared as a 10% aqueous solution gives an absorbance optical density of 0.040 after autoclaving and examination.

EXAMPLE VIII

Fructose beer (750 ml.) is clarified by treating with activated carbon and diatomaceous earth as in Example I. The filtered beer is then passed through the series of short anion exchange resin column (IRA-400), long IR-112 cation exchange resin column, and long IRA-400 anion exchange resin column as in Example I. The beer is then concentrated and crystallized in the usual manner. The following Table VI summarizes the data of the foregoing example.

Table VI

| Solution | Volume, ml. | pH | Rotation | Percent Fructose | Grams Fructose |
|---|---|---|---|---|---|
| Beer | 750 | 5.0 | $-14.72^{4°}$ C. | 16.3 | 120 |
| IRA-400 (Short) | 860 | 9.6 | $-12.35^{26°}$ C. | 13.9 | 119 |
| IR-112 | 970 | 3.4 | $-11.05^{23°}$ C. | 12.3 | 119 |
| IRA-400 | 1,025 | 9.5 | $9.4^{27°}$ C. | 10.6 | 110 |

Fructose crystals obtained in the foregoing manner when prepared as a 10% aqueous solution and examined with light having a wave length of 350 mu exhibit an absorbance of 0.036 after autoclaving, as in Example I.

EXAMPLE IX

Fructose fermentation beer (750 ml.) is clarified as in Example I and to the beer is added 6 ml. of 5 N sodium hydroxide. The sodium hydroxide treated beer is allowed to stand for 15 minutes with stirring. Thereafter 7.5 g. of diatomaceous earth is added and the mixture stirred for 15 minutes and then filtered. The color of the beer becomes pronounced greenish-yellow between 30 and 60 minutes after addition of the sodium hydroxide. The beer is then passed over the cation exchange resin column (IR–112) and finally through the anion exchange column (IRA–400) as used in Example I. The effluent therefrom is evaporated and crystallized in the usual manner and crystals when prepared as a 10% aqueous solution gives an absorbancy of 0.040 at 350 mu when autoclaved in the usual manner.

EXAMPLE X

A fructose fermentation beer (730 ml.) prepared as described herein is clarified and filtered in the usual manner. To the filtered beer having a pH of 6.7 is added 1.3 ml. of 5 N sodium hydroxide which is an amount just sufficient to completely flocculate the said beer so that there is no further turbidity formed in the beer on further addition of alkali. The fructose solution after the addition of the 1.3 ml. of sodium hydroxide has a pH of 8.6. The alkaline beer is then filtered with 7.5 g. of a filter aid (Hyflo) and the beer passed through the standard IR–112 cation resin column and a final IRA–400 anion resin column at the usual rate of flow of 30 ml. per minute. The resulting beer is concentrated under vacuum to about 85% fructose and crystallized as in Example I. The crystals when prepared as a 10% solution and autoclaved in the usual manner, yield a solution having an optical density of 0.044 when examined in a 1 cm. cell with light having a wave length of 350 mu.

EXAMPLE XI

A fructose fermentation beer (750 ml.) prepared as described herein and having a pH of 6.7 is clarified by treating with activated carbon (7.5 g.) and diatomaceous earth (7.5 g.) and filtered. The beer is then passed through an anion exchange column containing about 150 ml. of regenerated IRA–400 anion exchange resin having a depth of about 48 cms. at a rate of about 15 ml. per minute. The relatively slow rate of flow is due to the formation of a precipitate on the resin column which partially blocks the flow of solution therethrough. Thereafter, the effluent is passed through a column of about 150 ml. of regenerated IR–112 cation exchange resin having a depth of about 48 cms. at a rate of about 30 ml. per minute. The resulting beer is concentrated under vacuum to about 85% fructose and crystallized as in Example I. Samples of the crystals prepared as a 10% solution are autoclaved for 20 minutes at a temperature of 114° C. and exhibit an optical density of 0.048 when examined in a 1 cm. cell with light having a wave length of 350 mu.

From the preceding examples, it is apparent that the IRA–400 anion exchange resin column is less than 100% effective in removing condensed color bodies from a fructose beer when the pH of the said beer is relatively high and that for optimum results it is preferable to pass the effluent from the IR–112 cation exchange resin column through a final strongly basic anion exchange resin column, such as a second IRA–400 resin column. And, while in the preceding examples illustrating several processes embodying the present invention the fructose containing solutions are contacted with IRA–400 resin as the strongly basic anion exchange resin and IR–112 resin as the strongly acidic cation exchange resin, fructose solutions are also effectively decolorized by the said processes having the IRA–400 and IR–112 resins replaced by any of the herein disclosed equivalent strongly basic anion or strongly acidic cation exchange resins, respectively.

In the present invention and specific examples the strongly basic anion exchage resins, such as the IRA–400, are used in the basic state and when reference is made to "regenerated IRA–400" or "alkali-activated IRA–400," it is intended to indicate that the basic groups of the resin are combined primarily only with ionic hydroxyl groups and with only very small amounts of any other anions. In practice, the said anion exchange resins are "regenerated" or "alkali-activated" by passing sufficient 0.5 N or 1.0 N sodium hydroxide through the resin column until the effluent is strongly alkaline and washing thoroughly with distilled or deionized water. The strongly acidic cation exchange resins, such as the IR–112, are used in the acidic state and when reference is made to "regenerated IR–112" or "acid-activated IR–112," it is intended to indicate that the strong acid groups of the said resin, such as the sulfonic acid groups, contain replaceable hydrogen ions and substantially no other cations. In practice, the said cation exchange resins are "regenerated" or "acid-activated" by passing sufficient 0.5 N or 1.0 N sulfuric acid through the resin column until the effluent is strongly acidic and thereafter washing the column with distilled or deionized water until the effluent water contains no sulfate ions.

In the present invention and in the foregoing examples, the rate of flow of fructose or similar sugar solution through the resin columns is not critical, since considerable variation can be made therein without seriously interfering with the removal of color-forming bodies. With the cation exchange resins, the fructose and similar Acetobacter oxidized alcohol sugar solutions which are not sensitive to acid pH's produced by even the strongly acidic cation exchange resins in the instant invention, no harm is caused by reducing the rate of flow substantially below the 30 ml. per minute rate. Thus, with the cation exchange resin treatment, processing time is the only important limiting factor with regard to the lower limit of the rate of flow through the said cation exchange resin columns. It is, of course, possible to increase the flow rate to such an extent that the contact time is less than required for effective removal of cations and for this reason the rate of flow of solution through the 150 ml. cation resin column having a bed depth of 48 cms. is generally maintained below about 40 ml. per minute.

With the strongly basic anion exchange resins, the duration of contact of the fructose solutions must be more closely controlled, since very prolonged contact resulting from very slow flow rates will cause conversion of fructose to glucose and mannose. It is thus generally desirable to maintain the rate of flow of the fructose or similar sugar solution through the said 150 ml. anion exchange resin column having a bed depth of 48 cms. between about 15 ml. per minute and 40 ml. per minute.

While the foregoing specific examples have been concerned with the purification of fructose solutions prepared by oxidizing or fermenting mannitol with *Acetobacter suboxydans*, it should be understood that other sugar solutions prepared by fermenting the corresponding sugar alcohol with *Acetobacter suboxydans* or other sepcies of the genus Acetobacter, such as *Acetobacter xylinum* and *Acetobacter aceti*, can be purified in the same manner as the fructose. Examples of other sugar solutions which can be purified in the foregoing manner are d-xylulose prepared by fermenting d-arabitol with *Acetobacter suboxydans*; l-adonulose prepared by fermenting adonitol (meso) with *Acetobacter suboxydans*; d-fructose prepared by fermenting d-mannitol with *Acetobacter xylinum*; l-sorbose prepared by fermenting sorbitol with *Acetobacter suboxydans* or *Acetobacter xylinum*; l-allulose prepared by fermenting allitol (meso) with *Acetobacter xylinum*; and volemulose prepared by fermenting d-volemitol with *Acetobacter xylinum*. It is thus possible to purify and stabilize the color of a wide variety of sugar solutions prepared by the oxidation of sugar alcohols including pentitols, hexitols, and heptitols as well as higher sugar alcohols by means of Acetobacter microorganisms. It is therefore possible to produce on both a laboratory and commercial scale sugar solutions or crystalline sugars of high purity and color stability by a relatively simple and inexpensive method which heretofore were obtainable only with great difficulty and expense.

It should also be understood that in addition to the herein disclosed method of improving the color stability of sugar solution, other purification or decolorization treatments can be used, such as contacting the sugar solution with decolorizing carbon or similar decolorizing agents, at any stage in the herein disclosed method and such added treatment does not circumvent nor interfere with the present process.

Others may readily adapt the invention for use under various conditions of service, by employing one or more of the novel features disclosed or equivalents thereof. As at present advised with respect to the apparent scope of our invention, we desire to claim the following subject matter.

We claim:

1. A process of purifying sugar solutions to improve the color stability thereof which comprises raising the pH of a solution of an Acetobacter oxidized polyhydric sugar alcohol containing potential color-forming bodies to a pH in excess of about pH 7 and not substantially above pH 11 to cause the said color-forming bodies to condense, and intimately contacting the said solution containing the condensed color-forming bodies with a mass of strongly acidic cation exchange resin and thereafter contacting with a mass of strongly basic anion exchange resin, and the contact between the said solution and each said resin being terminated before an appreciable amount of the fructose therein is degraded; whereby elimination of a substantial proportion of the color-forming bodies responsible for the formation of color when autoclaving the said solution is effected.

2. A process as in claim 1 wherein the said strongly basic anion exchange resin is an alkali-activated anion exchange resin containing quaternary ammonium groups and the said strongly acidic cation exchange resin is an acid-activated cation exchange resin containing sulfonic acid groups.

3. A process of purifying sugar solutions to improve the color stability thereof which comprises adding to a solution containing an Acetobacter oxidizid polyhydric sugar alcohol containing potential color-forming bodies an alkaline reagent to adjust the pH thereof between pH 9 and pH 11 until a flocculent precipitate forms therein and thereafter filtering the said solution, intimately contacting the said solution with a mass of strongly acidic cation exchange resin and thereafter contacting with a mass of strongly basic anion exchange resin, and the contact between the said solution and each said resin being terminated before an appreciable amount of the fructose therein is degraded; whereby elimination of a substantial proportion of the color-forming bodies responsible for the formation of color when autoclaving the said solution is effected.

4. A process of purifying sugar solutions to improve the color stability thereof which comprises adding to a solution of an Acetobacter oxidized polyhydric sugar alcohol containing potential color-forming bodies an alkaline reagent to raise the pH of the said solution to between about pH 9 and 11 and allowing the said solution to stand for at least several minutes while the color-forming bodies condense, thereafter filtering the said solution and intimately contacting the solution with a mass of strongly acidic cation exchange resin and with a mass of strongly basic anion exchange resin, and the contact between the said solution and each said resin being terminated before an appreciable amount of the fructose therein is degraded; whereby elimination of a substantial proportion of the color-forming bodies responsible for the formation of color when autoclaving the said solution is effected.

5. A process of purifying a sugar solution to improve the color stability thereof which comprises passing a solution of an Acetobacter oxidized polyhydric sugar alcohol containing potential color-forming bodies through a mass of strongly basic anion exchange resin to raise the pH thereof to between about pH 9 and 11 and allowing the said solution to stand for at least several minutes while the potential color-forming bodies condense, thereafter intimately contacting the said solution with a mass of strongly acidic cation exchange resin and with a mass of strongly basic anion exchange resin, and the contact between the said solution and each said resin being terminating before an appreciable amount of the fructose therein is degraded; whereby elimination of a substantial proportion of the color-forming bodies responsible for the formation of color when autoclaving the said solution is effected.

6. A process of purifying a sugar solution to improve the color stability thereof which comprises adding to a solution of an Acetobacter oxidized polyhydric sugar alcohol containing potential color-forming bodies an alkaline reagent to raise the pH of the said solution to between about pH 9 and 11 and filtering the said solution to remove any solids therefrom, intimately contacting the said filtered solution with a mass of strongly basic anion exchange resin, intimately contacting the anion exchange resin treated solution with a strongly acidic cation exchange resin, and the contact between the said solution and each said resin being terminated before an appreciable amount of the fructose therein is degraded, and finally contacting the cation exchange resin treated solution with a mass of strongly basic anion exchange resin; whereby elimination of a substantial proportion of the color-forming bodies responsible for the formation of color when autoclaving the said solution is effected.

References Cited in the file of this patent

UNITED STATES PATENTS

| | | |
|---|---|---|
| 2,228,514 | Griessbach | Jan. 14, 1941 |
| 2,534,694 | Blann | Dec. 19, 1950 |
| 2,561,695 | Gustafson | July 24, 1951 |
| 2,568,925 | Mills | Sept. 25, 1951 |
| 2,578,937 | Kumir | Dec. 18, 1951 |
| 2,594,440 | Hughes | Apr. 29, 1952 |
| 2,606,847 | Newkirk | Aug. 12, 1952 |
| 2,635,061 | McBurney | Apr. 14, 1953 |
| 2,753,279 | Cushing et al. | July 3, 1956 |